United States Patent Office 2,978,981
Patented Apr. 11, 1961

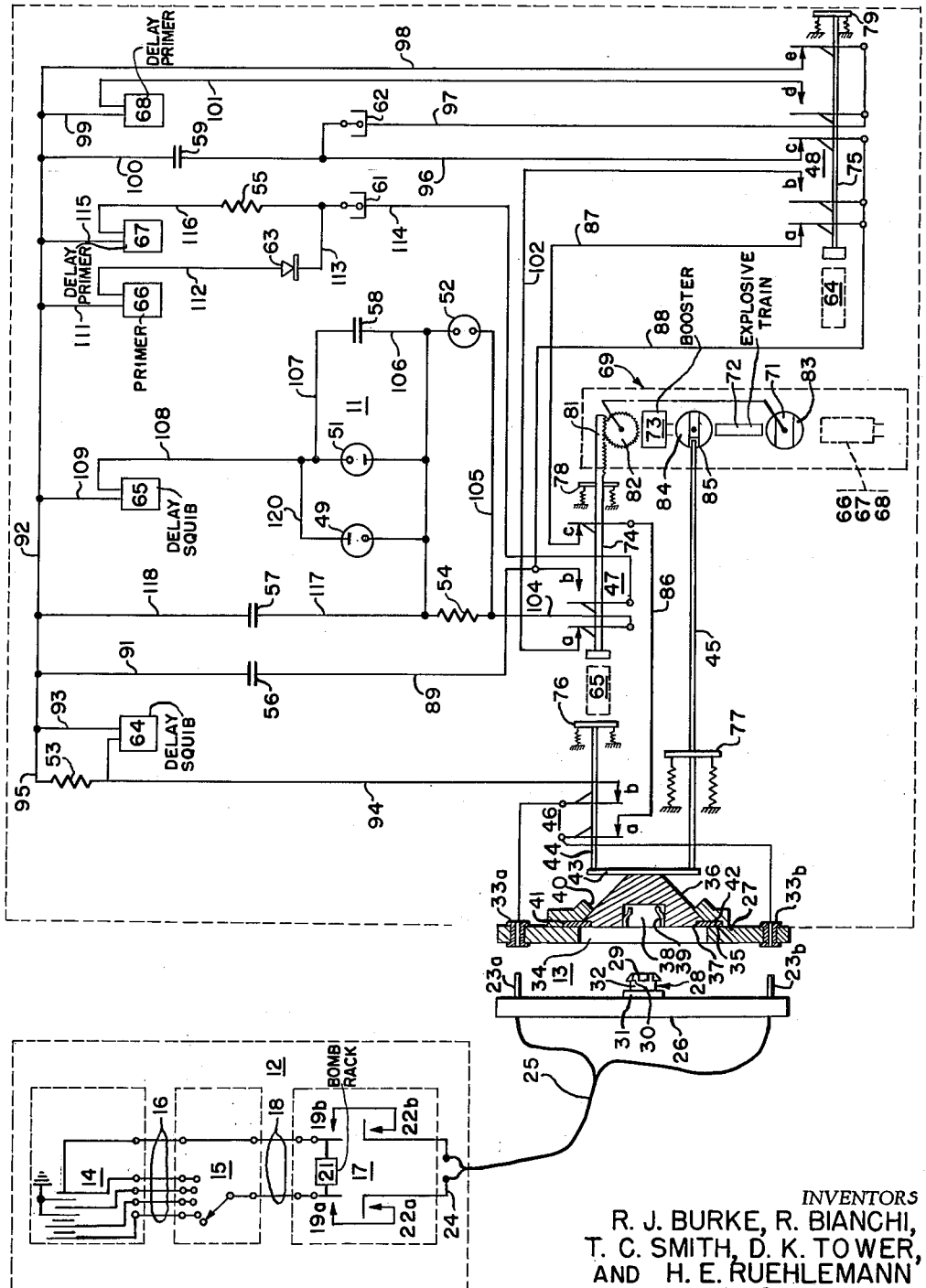

2,978,981
BOMB FUZE

Herbert E. Ruehlemann, Huntingdon Valley, Pa., Richard J. Burke, Silver Spring, and Renato Bianchi, Beltsville, Md., and Thomas C. Smith and Dell K. Tower, Poughkeepsie, N.Y., assignors to the United States of America as represented by the Secretary of the Navy Filed Apr. 11, 1956, Ser. No. 577,617

7 Claims. (Cl. 102—70.2)

This invention relates generally to ordnance fuzes, and more particularly to electrical fuzing arrangements for aircraft launched bombs.

Heretofore devised electrical bomb fuzing arrangements have not been found to operate wholly satisfactorily with present day high speed aircraft by reason of their inability of adaptation to the severe streamlining requirements of present day aircraft. In addition certain safety and remote control features dictated by present day uses have been found lacking in these earlier types of bomb fuzes.

Accordingly, one object of the present invention is to provide a new and improved bomb fuze arrangement readily adapted to the severe streamlining requirements of modern day aircraft.

Another object of the present invention is to provide a new and improved bomb fuze arrangement enabling pilot preselection of fuze firing characteristics pertinent to the target at hand at the instant the bomb is launched from the aircraft.

A further object of the present invention is to provide a new and improved ordnance fuzing arrangement wherein energization of the fuzing device cannot take place until several interlocking safety conditions pertinent to the aircraft have been satisfied.

A still further object of the present invention is to provide an electrical bomb fuze arrangement wherein several modes of fuze operation are obtainable by pilot preselection of the potential applied thereto.

Another still further object of the present invention is to provide a new and improved electrical connector for an aircraft launched bomb.

Other objects and many of the attendant advantages of this invention will be readily appreciated as the same becomes better understood by reference to the following detailed description when considered in connection with the accompanying drawing whereon is shown a schematic drawing of the fuzing arrangement of the present invention.

Referring now to the drawing whereon reference numeral 11 generally indicates the components of the bomb fuze per se, reference numeral 12 generally indicates the components of the remote control fuzing equipment affixed to the aircraft and reference numeral 13 generally indicates an electrical connector. The remote control equipment 12 comprises a conventional power supply, or source, 14 capable of supplying at least two potentials at two different polarities; i.e., for example ±195 v. D.C. and ±300 v. D.C., to a control, or selector, switch 15 through cable 16. Selector panel, or switch, 15 is electrically connected to safety switch 17 through cable 18. Safety switch unit 17 consists of a pair of normally open electrical contacts 19a and 19b, associated with the aircraft's bomb rack 21 and adapted to be moved to a closed position when the bomb is free to fall away from the aircraft, and a pair of normally open delay contacts 22a and 22b, said contacts being electrically connected to electrical pins 23a and 23b of connector 13 through pull down switch 24 and interconnecting cable 25. It should be noted that delay contacts 22a and 22b are adapted to be moved to a closed position when the bomb has fallen free from the aircraft to the extent of the length of cable 25 and the length of travel of the pull down switch 24 thereby completing the electrical circuit between power supply 14 and plug 13.

Electrical connector 13 includes a plug base member 26 and a cooperating socket base member 27. Base member 26 consists of a pair of male, or pin, electrical contacts 23a and 23b and plug 28 having head and base enlarged diameter portions 29 and 31, respectively, and a recessed diameter portion 32. The enlarged head portion 29 has a plurality of equidistantly recessed portions 30 each having the same diameter as portion 32.

Socket base member 27, secured to the bomb by any one of many well-known methods, consists of peripherally extending female electrical contacts, or receptacles, 33a and 33b, adapted to receive male contacts 23a and 23b and to allow discrete rotative movement of said male contacts therein, such for example, as in a clockwise direction to a final position within the female receptacles aperture 34, and recess 35. Forming a component part of member 27 is frustro conical member 36 having a recessed cylindrical portion 37 formed thereon and a recess, or receptacle, 38 formed therein. Secured to conical member 36 and disposed within recess 38 are a plurality of tensioned finger members 39, each having a width equivalent to that of the recessed portions 30, which members are adapted to intermesh with the recessed diameter portion 32 when the male contacts 23a and 23b are initially positioned within the female receptacles 33a and 33b. Upon rotation of the plug 28 within receptacle 38 to a final position therein, the finger members 39 are positioned on the shank 32 subjacent the enlarged segmented portions 29 of plunger 28. It will be apparent to one skilled in the art that the connector members 26 and 27 may be disengaged upon manual rotation of either member in a counter-clockwise direction. Conical member 36 is secured within a flange portion 40 surrounding aperture 34 of base member 27 by a frangible ring, or washer, 41 seated in recess 35 and abutting collar 42 of conical member 36. Frangible ring 41 is adapted to be ruptured upon an attempted forced removal of plug 28 from recess 38 thereby dislodging member 36. Affixed to the underside of member 36 is transverse bar 43, said bar having actuating rods 44 and 45 secured to the extremities thereof.

The bomb fuze 11 of the present invention consists of a plurality of electrical circuitry, electroresponsive pyrotechnic devices, and mechanical locking devices. The electrical circuitry consists of a plurality delay arming and firing circuits which includes switches 46, 47, 48, diode tubes 49, 51, 52, fixed resistors 53, 54, 55, and fixed capacitors 56, 57, 58, 59. The breakdown voltage requirements of diodes 49 and 51 are identical (i.e., 100 volts) and substantially less than that of diode 52 (i.e., 225 volts). Also forming part of the fuze electrical circuitry are a pair of impact actuated switches 61, 62 and a current rectifier 63. The electroresponsive pyrotechnic devices of the bomb fuze 11 comprise a pair of delay squibs 64, 65, a plurality of primers 66, 67, 68, each of said primers having a different ignition time, and an explosive arrangement, or fuze detonating mechanism, generally indicated by the reference numeral 69, said train including bomb detonator 71, segmented explosive train 72, and booster, or explosive, charge 73. The mechanical locking, or safety, devices of the novel bomb fuze 11 include a plurality of actuating rods 44, 45, 74 and 75, said rods being retained in their initial position by resilient or tensioned members 76, 77, 78 and 79 respectively affixed to each of said rods. Affixed to, or integrally formed with, actuating rod 74 is ratchet 81 engaging pinion gar 82, said gear being adapted to mechanically rotate arming rotor 83 so as to align detonator 71 with train 72 and primers 66, 67 and 68, upon movement of rod 74 by ignition of squib 65. Also included is spring loaded notched wheel 84, said wheel being maintained by engagement of rod 45 with notch 85 in an unaligned position with explosive train 72 thereby rendering the fuze arming device nonoperative. Upon withdrawal of rod 45 from notch 85 by rupture of frangible washer 41, spring loaded wheel 84 is adapted to rotate to a position whereby the segment of the train 72 disposed therein is in alignment with the train thereby rendering said train in an operable, or armed, condition.

For purposes of showing the inter-relationship existing between the diverse components in the fuzing arrangement of the present invention, the following detailed operational sequence is described. Upon release of the bomb from the aircraft's bomb rack 21, the electrical circuit between the fuze 11 and remote control unit 12, contained in the aircraft, remains interrupted until the bomb has fallen free to the extent of the length of cable 25 whereupon the circuit is momentarily completed by the closure of contacts 22a and 22b by the tension exerted on pull down switch 24 by flexible cable 25. The operation of contacts 22a and 22b, and the prior operation of contacts 19a and 19b by the bomb rack 21 serves to momentarily apply the potential output of power source 14 selected by the aircraft's pilot on control switch 15 to the bomb fuze circuit 11 through an electrical circuit comprising cables 16, 18, 25, switches 15, 17, 24, and connector 13. It may be noted that by this arrangement, premature charging of the fuze is prevented.

While the free falling bomb exerts tension on the pull down switch 24, but before cable 25 forcefully pulls plug 28 from aperture 38, the selected potential passes through contacts 23b and 33b of connector 13, closed contact a of switch 46, wire 86, closed contact c of switch 47, and wire 87 to closed contact a of switch 48. From this point two parallel circuits are closed for charging storage capacitors 56 and 59. The circuit to capacitor 56 is completed through wires 88 and 89, capacitor 56, wires 91, 92, and 93 to pyro delay squib 64, said squib having, for example and not by way of limitation, a 2 second ignition delay period, wire 94, and contact b of switch 46 to severable contacts 33a and 23a of connector 13. Squib 64 is bridged by a circuit comprised of wires 92, 95, and fixed resistor 54 to provide a circuit around the squib even after the same has been fired and open circuited. The circuit to storage capacitor 59 is completed from wire 88 through contact c of switch 48, wire 96, capacitor 59, wires 100 and 92, and divides between wire 93 and squib 64, and wire 95, resistor 53, wire 94, contact b of switch 46 and contact, or connection 33a. Thus energy storage capacitors 56 and 59 are charged and potential placed across electroresponsive delay squib 64, during the period of free fall of the bomb while the same exerts tension on pull-down switch 24 immediately prior to the forced removal of plug 28. Upon the forced removal of plug 28 and the consequent rupturing of frangible retaining ring 41, conical member 36 is dislodged from its secured position in socket base member 27 thereby enabling resilient members 76 and 77 to displace rods 44 and 45 from their initial position so as to operate switch 46 and to release wheel 85 for rotation to an aligned position with reference to explosive train 72.

In the event that the fuze 11 should experience an impact during the delayed ignition period of squib 64, both storage capacitors 56 and 59 will be shorted out and discharged thereby rendering the fuze sterile and entirely safe for disposal, etc. The sterilizing circuits for both capacitors are completed through impact operated switch 62, i.e., for capacitor 56, the circuit consists of wires 89, 88, contact c of switch 48, wire 96, impact switch 62, wire 97, contact e of switch 48, wires 98, 92, and 91, whereas, for capacitor 59, the circuit consists of wire 96, impact switch 62, wire 97, contact e of switch 48, wires 98, 92, and 100.

If no impact is received during the initial fixed delay period, the ignition of squib 64 displaces actuating rod 75 against the indicated tension exerted thereon by member 79 thereby operating switch 48 secured thereto and preventing any future possibility of sterilizing firing capacitors 56 and 59. Operation of switch 48 activates a self-destruction circuit which includes capacitor 59, wires 100, 92, and 99, primer 68, having by way of example, an 11 second delayed ignition period, wire 101, closed contact d of switch 48, wire 97, and impact switch 62. Upon the first impact after the initial fixed delay period, switch 62 will complete the circuit thereby discharging capacitor 59 through primer 68 which will set off the explosive arrangement 69 and assure the ultimate explosion, or self-destruction of the bomb.

Up to this point, the operation of the fuze is identical without regard to which of the available potentials is selected by the aircraft's pilot on control switch 15 and fed thereto. To illustrate the various operational modes resulting from potential selection, the operation of fuze 11 for each of the assumed potentials will now be described.

Assuming that a +300 v. potential has been selected by the pilot, that potential will be stored in capacitor 56 by the circuit connection hereinbefore described. The subsequent operation of switch 48 upon the expiration of the delay ignition period of squib 64 transfers the charge on capacitor 56 to capacitor 58 via a charging circuit which includes wires 89, 88, the now closed contact b of switch 48, wire 102, closed contact a of switch 47, wires 104, 105, arc discharge diode 52, wire 106, capacitor 58, wires 107, 108, squib 65, having by way of example a delay period of 4.5 seconds, and wires 109, 92, 91. The subsequent ignition of squib 65 displaces rod 74 against the indicated tension exerted thereon by resilient member 78 so as to operate switch 47 and pinion 82 to align detonator 71 in rotor 83, by conventional means not indicated, with the explosive train 72 thereby rendering arming arrangement 69 continuous from primers 66, 67, and 68 to booster 73. Operation of switch 47 closes contact b thereby arming the fuze 11 by placing primers 66 and 67 into a firing circuit operable upon closure of impact switch 61. Actuation of impact switch 61 by target collision will result in immediate detonation of the fuze by the discharge of the energy on capacitor 56 through instant primer 66 through a firing circuit consisting of wires 91, 92, 111, primer 66, wire 112, rectifier 63, wire 113, impact switch 61, wire 114, now closed contact b of switch 47, and wire 89.

If instead, a —300 v. potential had been selected, the above described firing circuit would have been completed the same way, except that the unidirectional characteristic of rectifier 63 in series with instant primer 66 would place a fuze under the control of delay primer 67, having by way of example a 50 millisecond delay period, through wires 115, 116, and the fuze would detonate with that delay after target impact.

If a potential of +195 v. be selected by the pilot, that potential, distributed by the before described firing circuit would not be sufficient to break down diode 52, and therefore the firing circuit to capacitor 56 will be completed via resistor 54, wires 117, 118, 92, 91 to charge capacitor 57. Resistor 54 is of sufficient magnitude to introduce a delay time of, by way of example, 3½ seconds before the charge on capacitor 57 is sufficient to break down diode 49. The ultimate breakdown of diode 49 enables the charge on capacitor 57 to ignite delay squib 65 through a circuit comprising wires 120, 108, 109, 92, 118 and 117. Ignition of squib 65 operates switch 47 and aligns arming device 69 and places the fuze 11 under control of primer 66 and impact switch 61 as before described. It is to be noted, by way of specific example and not by way of limitation, that a total delay period of 10 second exists before the fuze is fully armed.

Again, as before, if the −195 v. potential had been selected by the pilot, the above described firing circuit would have been completed in substantially the same way except that conduction would take place through reverse connected diode 51 instead of diode 49, and the fuze is under the control of delay primer 67.

From the above description when considered in connection with the accompanying drawing, it will be apparent that an aircraft launched bomb fuzing arrangement has been developed assuring maximum safety to the aircraft and the optimum possibility of target destruction. It will also be apparent that an electrical connector has been developed which, by the application of a slight turning torque to either base member, will permit manual removal, or disconnection, thereof without releasing the above described locking device and consequent operation of the fuze, and will permit operation of the fuze upon a forced removal thereof.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. An ordnance fuze arrangement comprising, in combination, a fuze detonating mechanism, a source of a plurality of available unidirectional potentials, first and second capacitors electrically coupled to and chargeable by said source, first electroresponsive exploder means being ignitable by said source, means for selectively connecting said capacitors and said first exploder means to said source, first electrical switching means operatively connected to said first exploder means, said first switching means being operated from an initial position to a moved position upon ignition of said first exploder means, second electroresponsive exploder means being discretely ignitable by the charge on said first capacitor upon operation of said first switching means to said moved position, second electrical switching means operatively connected to said second exploder means, said second switching means being operated from an initial to a moved position in response to ignition of said second exploder means, a first initially nonoperable electroresponsive detonating means being coupled to and rendered discretely operable by the charge on said first capacitor upon operation of said second switching means to a moved position, said first detontating means being ignitable to actuate said fuze detonating mechanism upon target impact, and second initially nonoperable electroresponsive detonating means being coupled to and rendered operable by the charge on said second capacitor upon operation of said first switching means to said moved position, said second detonating means being ignitable to actuate said fuze detonating mechanism upon subjection of said fuze to an impact force.

2. An ordnance fuze arrangement comprising, in combination, an explosive charge, a source of a plurality of available potentials, a plurality of electrical storage devices chrgeable to a predetermined potential by said source, a first electroresponsive explosive device having a predetermined time delayed ignition, means for selectively connecting said storage devices and said first explosive device to said source thereby charging said storage devices and igniting said first explosive device, a first initially unactuated circuit selector device operatively connected to said first explosive device and being actuatable in response to ignition thereof, an initially nonoperable impact responsive self-destruction circuit having an electroresponsive detonator therein, said self-destruction circuit being electrically connected to a second of said storage devices upon actuation of said first selector device, thereby being rendered operable by the potential on said second storage device, a second electroresponsive explosive device having a predetermined time delayed ignition, circuit means for selectively connecting said second explosive device to said first storage device upon actuation of said first selector device thereby igniting said second explosive device by the charge on said first storage device, a second initially unactuated circuit selector device operatively connected to said second explosive device and being actuatable in response to ignition thereof, and an initially nonoperable impact responsive firing circuit having a plurality of detonators therein, said firing circuit being electrically connected to said first storage device upon actuation of said second selector device thereby being rendered operable to ignite said explosive charge upon target impact.

3. An ordnance fuze arrangement comprising, in combination, a source of a plurality of available unidirectional potentials of postive and negative polarities, electrical storage means chargeable to a predetermined potential and polarity by said source, first electrical exploder means ignitable by any one of said source potentials, connector means for discretely connecting said source to said storage means and to said first exploder means, a first unactuated electrical switching device operatively connected to said first exploder means and being actuated upon ignition thereof, second electrical exploder means being discretely ignited by the charge on said storage means upon the actuation of said first switching device, initially nonoperative impact ignited third electrical exploder means connected to said storage means and being rendered operative upon actuation of said first switching device, second unactuated electrical switching device operatively connected to said second exploder means and being actuated upon ignition thereof, initially nonoperative impact ignited fourth electrical exploder means connected to said storage means and being rendered operative upon actuation of said second switching device, said fourth exploder means including unidirectional potential conductive circuit means for rendering the ignition of said fourth exploder means selectively responsive to the polarity of the charge on said storage means; and fuze detonating means operatively connected to said third and said fourth electrical exploder means, said detonating means being selectively detonated by the ignition of said third and said fourth exploder means.

4. A remote control ordnance fuzing arrangement for safely arming an airborne bomb upon release thereof from the aircraft comprising, in combination, a unidirectional potential source having a plurality of available potentials disposed in said aircraft, manually operable means disposed in said aircraft for selecting one of said available potentials, initially nonoperative fuze detonating means disposed in said bomb, potential storage means disposed in said bomb chargeable to a predetermined potential by the selected potential of said source, first electroresponsive exploder means disposed in said bomb being ignitable by the selected potential of said source, detachable means affixed to said aircraft and to said bomb for selectively connecting and disconnecting said storage means and said first exploder means to said source and for rendering said fuze detonating means partially operative, first unactuated switching means operatively connected to said first exploder means and being actuated in response to the ignition thereof, thereby rendering said fuze detonating means operative, second electroresponsive exploder means disposed in said bomb being discretely ignitable by the potential on said storage means upon actuation of said first switching means, second unactuated switching means operatively connected to said second exploder means and being actuated in response to the ignition thereof, and initially nonoperative impact ignited third exploder means adapted to being rendered operative subsequent to ignition of said first and said second exploder means by the potential on said storage means, thereby to detonate said operative fuze detonating means upon target impact.

5. An ordnance fuze arrangement comprising in combination, a source of a plurality of available unidirectional potentials of positive and negative polarities, potential selector means coupled to said source for selecting one of said available potentials, an energy storage device selectively coupled to said selector means and being chargeable to a particular potential level and polarity by the selected potential from said source, a first electroresponsive detonator selectively coupled to said selector means and being ignitable by said selected potential, a first initially unactuated circuit switching device operatively coupled to said first detonator and being actuated upon ignition thereof, polarity and potential level discriminating circuit means including a second electroresponsive detonator adapted to being selectively ignited by the charge on said energy storage device upon actuation of said first circuit switching device, a second initially unactuated circuit switching device operatively coupled to said second detonator and being actuated upon ignition thereof, and an initially interrupted impact responsive firing circuit adapted to being rendered uninterrupted and coupled across said energy storage device upon actuation of said second switching device, said firing circuit including a pair of parallel connected electroresponsive primers, one of said primers having a unidirectional potential conducting element serially connected therewith.

6. In an ordnance fuze arrangement according to claim 5 wherein said polarity and potential level discriminating circuit includes an electroresponsive detonating device having a fixed delay ignition period, and a plurality of potential-sensitive ignition paths electrically connecting said detonating device to the energy storage device, a first ignition path having a first firing capacitor chargeable to a predetermined potential by the charge on said energy storage device, and a pair of parallel connected unidirectional current conductive elements connected to said detonating device and said unidirectional elements, said elements being adapted to discharge said first firing capacitor through said detonating device in response to a predetermined first potential on said energy storage device, and a second ignition path having a second firing capacitor chargeable to a predetermined potential by the charge on said energy storage device and dischargeable through said detonating device, and a bidirectional current conductive element connected to said second firing capacitor, said bidirectional element being responsive to a predetermined second potential on said energy storage device for effecting the charging of said second firing capacitor, said second potential being substantially higher than said first potential.

7. An ordnance fuze according to claim 5 and including another energy storage device selectively coupled to said selector means and being chargeable by the selected potential from said source, and another initially interrupted impact responsive firing circuit including a third electroresponsive detonator, said another circuit being rendered uninterrupted and coupled across said another energy storage device upon actuation of said first switching device.

References Cited in the file of this patent
UNITED STATES PATENTS

| | | |
|---|---|---|
| 2,404,553 | Wales | July 23, 1946 |
| 2,514,434 | Windes | July 11, 1950 |
| 2,658,182 | Jackson | Nov. 3, 1953 |
| 2,711,133 | Rines | June 21, 1955 |
| 2,719,486 | Plumley | Oct. 4, 1955 |
| 2,736,870 | De Jur | Feb. 28, 1956 |
| 2,853,010 | Bianchi | Sept. 23, 1958 |

FOREIGN PATENTS

| | | |
|---|---|---|
| 859,363 | France | June 3, 1940 |